United States Patent [19]

Rücker et al.

[11] 4,310,823
[45] Jan. 12, 1982

[54] STRAIN GAUGE STRIP ELEMENT AND METHOD OF ITS MANUFACTURE

[75] Inventors: Norbert Rücker, Karlstein; Michael Sellschopp, Bruchköbel; Hans-Ullrich Fuchs, Hanau, all of Fed. Rep. of Germany

[73] Assignee: W. C. Heraeus GmbH, Hanau, Fed. Rep. of Germany

[21] Appl. No.: 111,707

[22] Filed: Jan. 14, 1980

[30] Foreign Application Priority Data

Jan. 20, 1979 [DE] Fed. Rep. of Germany ....... 2902242

[51] Int. Cl.³ ............................................... G01L 1/22
[52] U.S. Cl. ......................................... 338/2; 338/334
[58] Field of Search .................... 338/2, 4, 5, 334; 73/141 A, 720, 721, 726, 727; 357/26

[56] References Cited

U.S. PATENT DOCUMENTS

| | | | |
|---|---|---|---|
| 3,122,717 | 2/1964 | Motsinger | 338/2 X |
| 3,315,200 | 4/1967 | Hannay | 338/2 |
| 4,086,554 | 4/1978 | Sieder | 338/2 |
| 4,195,279 | 3/1980 | Lemcor et al. | 338/2 |

FOREIGN PATENT DOCUMENTS 2550669  5/1977  Fed. Rep. of Germany .

*Primary Examiner*—C. L. Albritton
*Attorney, Agent, or Firm*—Frishauf, Holtz, Goodman & Woodward

[57] ABSTRACT

To permit adhesion of a strain gauge grid applied to a high temperature plastic, such as a polyimide, the side of the strip of polyimide which is to be attached to the support frame, the strain of which is to be measured, has a solderable surface applied thereto which consists, essentially, of three sublayers, as follows:

A first sub-layer of from 1 to 8 μm thickness of chromium nickel alloy, containing, for example, about 20% (by weight) of chromium, or an iron chromium nickel alloy containing, for example, about 50% iron, 49% nickel and 1% chromium (by weight);

a second sub-layer of at least about 5 μm thickness, preferably about 7.5 μm thickness of nickel and a third outer sub-layer of gold, for example, between about 4 to 10 μm thick, preferably, about 7 μm. The various sub-layers are applied, for example, after cleaning of the element with a volatile hydrocarbon, or toluol, by vapor deposition, for example, vaporization from a tungsten boat of the respective materials.

8 Claims, 1 Drawing Figure

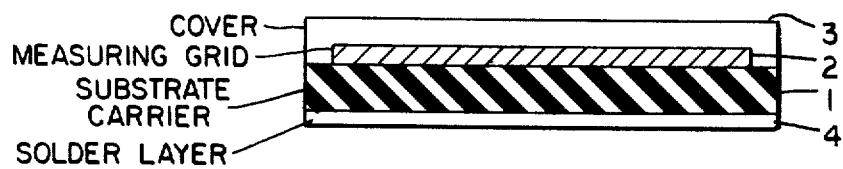

STRAIN GAUGE STRIP ELEMENT AND METHOD OF ITS MANUFACTURE

The present invention relates to a strain gauge and more particularly to the construction of a strain gauge strip element in which a support carrier, made of in insulating material, typically a plastic, had a strain gauge grid applied to one face thereof, the other face of the strip being attached to the workpiece, or structure, the strain of which is to be determined.

BACKGROUND AND PRIOR ART

Strain gauge strips, in which one side has a grid or other sensing element applied thereto have to be affixed to the structure, the strain of which is to be determined. Usually, the carrier is a plastic support of substrate on which a strain gauge grid is applied by vapor deposition or in a form of an atomized powder (see U.S. Pat. Nos. 2,556,132 and 2,621,276). The reverse side of the strip is then attached to the material structure, or frame to be tested for example by adhesion (see German Disclosure Document DE-OS 25 50 669) or welded thereon. Neither of these attachment methods are free from difficulty. Adhering the strip element is subject to undesired creep effects; welding the strip, for example already supported on another support carrier, involves the use of high temperatures which may damage and, in a limiting case destroy the strip, and additionally can lead to change in the characteristics of the measuring grid itself.

THE INVENTION

It is an object to provide a strain gauge strip element in which the aforementioned disadvantages are avoided, which can be easily made, and which does not introduce manufacturing difficulties.

Briefly, the strain gauge strip in accordance with the present invention has a layer applied to the side of the strip, which is to be affixed to the structure to be tested, which can be soldered; preferably, this layer is a composite which is applied by vapor deposition, by atomization by a powder, by sputtering or the like, and, preferably, has three layers in which the one immediately adjacent the plastic carrier is a chrome nickel, or iron-chrome nickel alloy of between about 2 $\mu$m to 8 $\mu$m thickness on which a nickel layer is applied of at least about 5 $\mu$m thickness which, in turn, is covered by a layer of gold of between about 4 to 10 $\mu$m thickness. Alloys which have been found particularly suitable are chrome-nickel alloys which, apart of unavoidable contaminants, have about 20% (by weight) chromium, the remainder nickel; for iron-nickel-chrome alloys, an alloy is suitable which, apart from unavoidable contaminants, has about 50% iron, 49% nickel and 1% chromium (all by weight). The thickness of the chrome-nickel or iron-nickel-chrome alloy layers, preferably, is about 5 $\mu$m.

The strip has the advantage that it can be soldered by dip-soldering for a period longer than three minutes, for example about five minutes. Tearoff strength of over 300 gram-force/mm$^2$, even more than 500 g-force/mm have been obtained. The various partial layers of the solder layer have excellent adhesion among each other and, additionally, the presence of the nickel-chrome or iron-nickel-chrome alloy layer affects a particularly good adhesion on the plastic carrier strip. The outer layer of gold insures protection against corrosion.

A suitable carrier is a polyimide material.

DRAWING, ILLUSTRATING AN EXAMPLE

The single FIGURE is a highly schematic cross-sectional view—in which the thicknesses are not to scale, of a strain gauge strip.

The strain gauge strip has a carrier strip or foil of temperature resistant plastic, such as a polyimide, formed in strip, tape or ribbon shape, and forming an elongated foil. The foil 1 has applied to one surface thereof a measuring grid 2 shown only schematically. An organic cover foil 3 covers the measuring grid 2 and protects the grid against ambient and environmental affects.

In accordance with the invention, the side of the carrier foil 1 which is obverse with respect to the measuring grid has a solderable layer 4 applied thereto which covers the entire surface of the carrier or substrate foil 1.

The strip is made this way: the polyimide carrier foil 1 is capable of withstanding a temperature of at least about 150° C., and one surface thereof has the measuring grid applied thereto by vapor deposition or powder deposition. This side of the carrier foil, as well as the carrier foil itself can be prepared in accordance with any well known and standard process and does not form part of the present invention. The measuring grid 2, itself, usually consists of a noble metal alloy with small additive of non-noble metals and is structured by photolithographic processes. The cover foil 3 is an organic cover foil, for example a covering lacquer. The carrier foil 1 itself should have a smooth surface, that is, should not have any substantial or noticeable roughness.

In accordance with the feature of the invention, the carrier foil 1 is cleaned at the side of the surface to which the soldered layer 4 is to be applied with a volatile hydrocarbon, such as gasoline or the like, or toluol. As a next step, the foil is exposed to a glow discharge in an argon atmosphere at a pressure of about $2 \times 10^{-2}$ Torr (about 2–3 Pa) with a discharge power of about 0.1 m A/cm$^2$, for a glow discharge time of between about 10 to 30 minutes. A cathode of extreme surface purity is used. Thereafter, a chromium-nickel alloy layer, or an iron-nickel chromium alloy layer is vaporized from a tungsten boat at a pressure of $2 \times 10^{-5}$ to $1 \times 10^{-6}$ Torr (about $2 \times 10^{-3}$ to $2 \times 10^{-4}$ Pa) at a speed of between about 10 to 20 $\mu$m/min. Nickel is then applied by vaporization of nickel with an electron beam gun at a pressure of between about $2 \times 10^{-5}$ to $2 \times 10^{-6}$ Torr (about $2 \times 10^{-3}$ to $10^{-4}$ Pa) at a speed of about 5 to 20 $\mu$m/min. Thereafter, gold is vaporized from a tungsten boat at $2 \times 10^{-5}$ to $1 \times 10^{-6}$ Torr (about $2 \times 10^{-3}$ to $10^{-4}$ Pa) at a speed of about 5 to 20 $\mu$m/min.

As can be seen, the speed of application of the nickel layer and of the gold layer is about the same.

Various change and modifications may be made within the scope of the inventive concept.

The strain gauge element can be applied to any suitable metal of the usual structural metals, such as steel, and brass of a composition of 60 weight percent copper and 40 weight percent zink. If the metal structure on which the strain gauge is to be applied is of a metal which cannot be readily soldered, for example, aluminium, special steps are required to prevent oxidation of the surface, as is well known in connection with aluminium soldering. A detailed explanation of how this element can be soldered on a substrate is found in text books relating to bonding, fusing, or adhering, by soldering, various metals, and reference is made to E. Sudasch, "Schweisstechnik", C. Hanser Verlag, München. The strain gauge foil or strip 1 preferably has a thickness of between 5 to 15 μm and, for example, generally is in the shape of an elongated rectangle, or an elipse to which the measuring grid is applied, for example, as described in German Disclosure Document DE-OS 25 50 669, or in accordance with any other suitable and known process.

We claim:

1. Strain gauge element comprising a strip, or foil like carrier element (1) of temperature resistant plastics;

a strain gauge grid (2, 3) applied to said carrier (1) on one side thereof, the other side of the element being adapted to be secured to a metal structure, the strain of which is to be measured by the gauge, and comprising, in accordance with the invention, a layer (4) capable of being soldered to said metal structure which includes three sublayers, the sublayer immediately adjacent said strip or foil like element (1) comprising a first sublayer of from 1 to 8 μm thickness of a material selected from the group consisting of a chromium-nickel alloy and an iron-chromium-nickel alloy;

the second sub layer being of at least 5 μm thickness of nickel;

and the third sub-layer next to said second sub-layer being of between 4 to 10 μm thickness and of gold.

2. Element according to claim 1, wherein the layer capable of being soldered is a composite comprising three sublayers, the sublayer immediately adjacent said strip or foil like element (1)

comprising a first sublayer of from 2 to 8 μm thickness of a material selected from the group consisting of a chromium-nickel alloy and an iron-chromium-nickel alloy;

the second sublayer being of at least 5 μm thickness and comprising nickel, and the third sublayer being of between about 4 to 10 μm thickness and comprising gold.

3. Element according to claim 2, wherein the chromium-nickel alloy contains about 20% by weight of chromium.

4. Element according to claim 1 wherein the iron-chromium-nickel alloy contains about 50% iron, 1% chromium and 49% nickel, by weight.

5. Element according to claims 1 or 3 or 4, wherein the first sublayer is about 4 μm thick, the second nickel sub-layer is about 7.5 μm thick and the third gold sublayer is about 7 μm thick.

6. Element according to claim 1, wherein the layer capable of being soldered is a vapor deposited layer.

7. Element according to claim 1, wherein the layer capable of being soldered is a powder-deposited layer.

8. Element according to claim 1 wherein said strip or foil-like carrier element (1) has a thickness of between 5 to 15 μm.

* * * * *